United States Patent
Pham et al.

(10) Patent No.: US 6,811,741 B2
(45) Date of Patent: Nov. 2, 2004

(54) METHOD FOR MAKING THICK AND/OR THIN FILM

(75) Inventors: Ai Quoc Pham, San Jose, CA (US); Robert S. Glass, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 229 days.

(21) Appl. No.: 09/919,075

(22) Filed: Jul. 30, 2001

(65) Prior Publication Data

US 2002/0127344 A1 Sep. 12, 2002

Related U.S. Application Data

(60) Provisional application No. 60/274,197, filed on Mar. 8, 2001.

(51) Int. Cl.[7] .............................. B28B 1/00; B28B 1/30
(52) U.S. Cl. ........................ 264/642; 264/309; 264/650
(58) Field of Search ................................ 264/642, 650, 264/309

(56) References Cited

U.S. PATENT DOCUMENTS

| | | | |
|---|---|---|---|
| 3,970,591 A | * | 7/1976 | Harris ...................... 252/521.1 |
| 5,021,304 A | | 6/1991 | Ruka et al. |
| 5,443,770 A | * | 8/1995 | Krstic et al. ................... 264/60 |
| 5,445,903 A | | 8/1995 | Cable et al. |
| 5,900,277 A | * | 5/1999 | Fox et al. .................... 427/180 |
| 6,074,771 A | | 6/2000 | Cubukcu et al. |
| 6,358,567 B2 | * | 3/2002 | Pham et al. ................. 427/421 |
| 2002/0006470 A1 | * | 1/2002 | Eberspacher et al. ....... 427/216 |
| 2002/0107133 A1 | * | 8/2002 | Troczynski et al. ............ 501/1 |

FOREIGN PATENT DOCUMENTS

| | | |
|---|---|---|
| DE | 19709571 C1 | 6/1998 |
| DE | 19801440 A1 | 7/1999 |

* cited by examiner

*Primary Examiner*—Christopher A. Fiorilla
(74) *Attorney, Agent, or Firm*—John P. Wooldridge; L. E. Carnahan; Alan H. Thompson

(57) ABSTRACT

A method to make thick or thin films a very low cost. The method is generally similar to the conventional tape casting techniques while being more flexible and versatile. The invention involves preparing a slip (solution) of desired material and including solvents such as ethanol and an appropriate dispersant to prevent agglomeration. The slip is then sprayed on a substrate to be coated using an atomizer which spreads the slip in a fine mist. Upon hitting the substrate, the solvent evaporates, leaving a green tape containing the powder and other additives, whereafter the tape may be punctured, cut, and heated for the desired application. The tape thickness can vary from about 1 $\mu$m upward.

20 Claims, No Drawings

METHOD FOR MAKING THICK AND/OR THIN FILM

RELATED APPLICATION

This application relates to U.S. Provisional Application No. 60/274,197 filed Mar. 8, 2001, and claims priority under 35USC120.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to the fabrication of films, particularly to a low cost method for making thick or thin films, and more particularly to a method of making films wherein a prepared solution is deposited on a substrate to be coated using an atomizer to produce films of various thickness and with flexibility.

A number of low cost non-vacuum based thick/thin ceramic film casting techniques are readily available. These include tape casting, tape calendering, colloidal dip coating and spin coating, screen-printing, gel casting, slip casting, pressure casting, etc. All of the above techniques require somewhat similar preparations of the slips containing the ceramic powder with different additives and solvents. However, the application approach of the slip differs from one technique to another, making certain techniques more suitable for certain specific applications. For instance, colloidal dip coating consists of dipping the substrate in the colloidal solution followed by withdrawing the substrate at constant speed. After complete evaporation of the solvent, a film is formed. There is little active control of the film thickness, the process must be done using trials and errors approach to find the right viscosity and the right solid loading in the solution in order to obtain the right film thickness. This technique is not limited by the size or shape of the substrate but there is a limit in the maximum film thickness (typically 10 $\mu$m) beyond which film cracking occurs because of drying shrinkage.

Tape casting requires the preparation of a more viscous slip and more additives such as binders, plasticizers. The slip is spread on a flat surface to a controlled thickness with the knife edge of a doctor blade, and the solvents are allowed to dry. The resulting tape, containing ceramic powders, plasticizers and binders is flexible. It can then be stripped from the casting surface, cut to size, then fired at high temperatures. Multilayer tapes are fabricated by sequential casting one layer on top of another. This technique is largely used in a number of areas including the microelectronic industry and the energy industry. Due to the use of the doctor blade, tape casting is limited to flat samples only. Also due to the use of the doctor blade that need to be kept parallel but separated from the substrate at a constant distance, tape casting is typically limited to films of thickness greater than say 50 $\mu$m. Thinner films can be prepared, however, this would require that the substrate must be very flat, which is difficult to achieve in certain applications. For very large size samples, say several feet long, such a flatness is almost impossible.

The present invention is a simple technique that can replace and/or complement the conventional tape casting technique while providing more flexibility with simplicity. The invention involves a method using a solution or slip similar to the prior techniques but with higher volatility and lower viscosity. The method involves depositing the solution via an atomizer and upon hitting a desired substrate the solution solvent evaporates, leaving a green tape or film containing a desired powder and other additives. The spraying can be carried out at room temperature and above, and deposited on a slightly heated substrate to accelerate the evaporation of the solvent.

SUMMARY OF THE INVENTION

It is an object of the present invention to provide a method for producing films of various thickness.

A further object of the invention is to provide a film forming method using an atomizer.

A further object of the invention is to provide a method for providing flexible films of about 1 $\mu$m and thicker.

A further object of the invention is to provide a method for producing flexible or non-flexible film on surfaces of various configurations.

Another object of the invention is to provide a method for producing films that can replace and/or complement the conventional tape casting technique while provide more flexibility with simplicity.

Another object of the invention is to provide a method for producing films wherein the solution contains a powder to be coated dispersed in a volatile solvent such as ethanol, and containing other desire ingredients, and wherein the solution is sprayed on a substrate using an atomizer, and upon hitting the substrate the solvent evaporates.

Another object of the invention is to provide an aerosol spray casting (ASC) technique for producing green flexible films, which can be punched, cut and heated.

Another object of the invention is to provide an ASC technique which can be carried out at room temperature or at elevated temperatures below the evaporation temperature of the solvent used, and which can be carried out using heated substrates.

Other objects and advantages of the present invention will become apparent from the following description. The invention is directed to a method for making thin and thick films at very low cost and which films are more flexible and versatile than films produced by the conventional tape casting technique, for example. The method involves ASC and produces a green flexible film, similar to the tape casted film but with several advantages:

1. The method is not limited to flat surfaces but can be considered for use on substrates of any size and shape, such as thin film casting on tubes.
2. The method can be used to deposit much thinner films than conventional tape casting because there is no requirement of exact distance between the spray nozzle (atomizer) and the substrate. The method can be carried out at room temperature or at an elevated temperature with or without the substrate being heated. The composition of the slip or solution used may be similar to that of the conventional tape casting slip, but includes a dispersant to prevent agglomeration, and the solvent has a higher volatility and the solution or slip has a low viscosity, whereby, solution is deposited as a fine mist, and the solvent evaporates upon hitting the substrate. The method can be used in a variety of applications requiring thin or thick films, such as in the fabrication of solid oxide fuel cells, ceramic membranes, multilayer films, etc.

DETAILED DESCRIPTION OF THE INVENTION

The present invention involves a method for producing thin or thick films carried out using an atomizer for depositing the film producing solution. The invention is a simple aerosol spray casting (ACS) technique that can replace and/or complement the conventional tape casting technique while providing much more flexibility with simplicity. The ASC method of this invention is not limited to flat substrates but can be used for coating substrates of any size and shape. The ASC method can deposit much thinner films than the conventional tape casting approach because there is no requirement of exact distance between the spray nozzle and the substrate to be coated. The method of this invention can be utilized to complement the tape casting techniques in applications where thick and thin films are required, with the thick film produced by tape casting and the thin film produced by ASC.

The ASC method of this invention basically involves two (2) operations. The first is the slip or solution preparation, and the second is the deposition of the solution onto a substrate by the use of an atomizer, each operation being separately described hereinafter.

The first operation consists of the preparation of the slip or solution to be used for a specific application. This operation is somewhat similar to solution or slip preparations for other techniques, such as tape casting, and is generally described as follows:

A desired powder to be coated is dispersed in a solvent, preferably organic. An appropriate dispersant is added to prevent agglomeration. Plasticizers and binders are subsequently added. Typically, this slip is very similar to the slip used in tape casting, except that the solvent will have higher volatility and the solution has lower viscosity.

The second operation is carried out to deposit the slip or solution formed in the first operation on substrate, as follows:

The solution is sprayed on a substrate to be coated using an atomizer defining ASC. The atomizer can be a pressure-based nozzle or preferably an ultrasonic device. The atomizer spreads the solution over the substrate in a fine mist. Upon hitting the substrate, the solvent evaporates, leaving a green tape containing the powder and the other additives (binder, plasticizers, etc). The spraying can be done at room temperature using a very slow deposition rate to allow the solvent to evaporate. Spraying can be done using a slightly heated substrate in order to accelerate the evaporation. The temperature should never exceed the evaporation or decomposition temperature of the organic binder and plasticizers. The heating can be done either by heating directly the substrate or by blowing hot air over the substrate. Typical solvents can be ethanol or methanol, for which typical process temperatures is below 60–70° C.

The result of this method involving ASC is a green flexible film that can be punched, cut, and/or heated (annealed) as required for its intended use. The green flexible film is very similar to tape cast films but with several advantages:

1. The ASC technique is not limited to flat samples or surfaces, but can be utilized for surfaces of any size and shape. In particular, thin film casting on tubes can be easily accomplished.
2. ASC can be used to deposit much thinner films than conventional tape casting because there is no requirement of exact distance between the spray nozzle and the substrate.

By the way of example, the ASC method can be carried out as follows:

1. A powder of yttira-stabilized-zirconia (YSZ) is dispersed in a solvent of ethanol, a dispersant composed of Menhaden fish oil is added to prevent agglomeration, a plasticizer composed of butyl benzyl phthalate and polyalkalyne glycol and a binder composed of polyvinyl butyral are added to produce a slip or solution for forming a film of YSZ on a substrate. The solution or slip is then sprayed on a substrate, such as nickel oxide/YSZ (typically used as an anode for solid oxide fuel cells), with the substrate being heated to 60° C. For environmental purposes, the evaporated ethanol can be collected in a trap which is hooked to the fume hood where the spraying takes place. The substrate used here is a NiO/YSZ composite that is either a green tape that was prepared using a conventional tape casting technique, meaning that it still contains all the binders and plasticizers in the tape, or a pre-sintered ceramic sample without any binder or plasticizers. In the first case the tape substrate with the deposited film is flexible. The bi-layer can then be punched, cut to the desired size, and then sintered at high temperatures.

In many applications, the ASC is a good complement to the tape casting. For example, for solid oxide fuel cell applications, there is a need to produce bilayers of electrode/electrolyte films. The electrode, which serves also as support of the structure, has typical thickness in the range of 100 to 1000 $\mu$m. The thickness of the electrolyte is typically 10 $\mu$m. It is very difficult to produce such a bi-layer using tape casting because of the very thin electrolyte film. Such a bilayer must be made using other techniques such as tape calendering or a combination of tape casting to make the electrode layer followed by a screen-printing step to make the electrolyte layer. Such a bi-layer can be easily processed using tape casting to make the electrode layer followed by ASC to deposit the thin electrolyte layer. The result is a green flexible bi-layer that can be punched and/or cut in different sizes. Also, the bi-layer can be entirely formed by the ASC method which has the capability to produce both thick and thin films.

The method can be used for ceramic as well as non-ceramic materials, including metals, and can be used to deposit both dense and porous films. In order to make porous film, a pore former material such as starch or carbon can be added to the slip. Upon decomposition of the pore former, holes are formed in the film. The solvent can be organic or a mixture of water and organic solvent. The addition of water enables the control of the volatility of the solvent. The deposition temperature can be extended up to 100° C.

It has thus been shown that the present invention enable the formation of thin and/or thick films at low cost. This simple method can replace and/or complement the conventional tape casting technique while providing more flexibility with simplicity. The method of the invention, which involves aerosol spray casting can be used for application involving any size and shape substrates, such as thin film casting on tubes. The method can be used to provide thin (~1 $\mu$m) film to thick films of several 100 $\mu$m.

While a particular embodiment of the invention has been described to exemplify and teach the principles of the invention, such is not intended to be limiting. Modifications and changes may become apparent to those skilled in the art, and it is intended that the invention be limited only by the scope of the appended claims.

What is claimed is:

1. A method for producing a sintered body comprising:
   providing a substrate, wherein said substrate is ceramic green tape that includes at least one binder and at least one plasticizer;
   casting a preformed solution onto said substrate using an atomizer to produce a film having a thickness of approximately 1 micron to several hundred microns thereby forming a bilayer, wherein said preformed solution comprises a ceramic powder;

punching the bilayer;

cutting the punched bilayer to a desired size; and sintering the cut bilayer.

2. The method of claim 1, wherein said atomizer spreads said preformed solution in a fine mist.

3. The method of claim 1, wherein the step of casting is carried out at room temperature.

4. The method of claim 1, wherein said substrate is heated.

5. The method of claim 4, wherein said substrate is heated by direct heating or by blowing hot air there across.

6. The method of claim 1, additionally including forming said preformed solution.

7. The method of claim 6, wherein the step of forming said preformed solution is carried out so as to include a solvent and dispersant for preventing agglomeration.

8. The method of claim 7, wherein the step of forming said preformed solution is carried out such that said solvent has a high volatility and said solution has a low viscosity.

9. The method of claim 7, wherein said solvent is organic.

10. The method of claim 7, wherein said solvent comprises material selected from the group consisting of ethanol and methanol.

11. The method of claim 6, wherein the step of forming said preformed solution is carried out by:

dispersing said powder in a solvent;

adding a dispersant to prevent agglomeration; and adding at least one of the group consisting of a plasticizer and a binder.

12. The method of claim 11, wherein said solvent has a high volatility and said preformed solution has a low viscosity.

13. The method of claim 12, wherein said solvent is organic or a mixture of organic and water.

14. The method of claim 12, wherein said solvent is selected from the group consisting of ethanol and methanol.

15. The method of claim 12, wherein the step of casting said preformed solution is carried out by said atomizer at a temperature below about 100° C.

16. The method of claim 15, wherein the step of casting is carried out by said atomizer by spraying a mist of said preformed solution onto said substrate, wherein said substrate is heated.

17. An method for producing a sintered body, comprising:

preparing a solution by dispersing a ceramic powder in a solvent;

adding to said solution a dispersant to prevent agglomeration;

adding at least one plasticizer and binder to said solution;

depositing said solution onto a substrate using an atomizer, wherein said substrate comprises a ceramic green tape that includes at least one binder and at least one plasticizer to produce a film having a thickness of approximately one micron to several hundred microns thereby forming a bilayer;

punching the bilayer;

cutting the punched bilayer to a desired size; and sintering the cut bilayer.

18. The method of claim 17, wherein said solvent is selected from the group consisting of ethanol and methanol.

19. The method of claim 17, wherein the step of depositing said solution is carried out at a temperature below about 100° C.

20. The method of claim 17, wherein the step of depositing said solution is carried out by spraying via said atomizer on said substrate, wherein said substrate is heated.

* * * * *